United States Patent [19]

Morishita et al.

[11] Patent Number: 4,724,915
[45] Date of Patent: Feb. 16, 1988

[54] DEVICE FOR CONTROLLING A MOTOR-DRIVEN POWER STEERING SYSTEM FOR A VEHICLE

[75] Inventors: Mitsuharu Morishita; Shinichi Kohge, both of Himeji, Japan

[73] Assignee: Mitsubishi Denki Kabushiki Kaisha, Japan

[21] Appl. No.: 21,488

[22] Filed: Mar. 4, 1987

[30] Foreign Application Priority Data

Mar. 19, 1986 [JP] Japan .................................. 61-63485

[51] Int. Cl.$^4$ ............................................. B62D 5/04
[52] U.S. Cl. ..................................... 180/79.1; 180/142
[58] Field of Search ....................... 180/79.1, 148, 142; 74/388 PS

[56] References Cited

U.S. PATENT DOCUMENTS 4,538,698  9/1985  Hashimoto et al. ............... 180/79.1

FOREIGN PATENT DOCUMENTS 60-228919  11/1985  Japan ................................. 180/79.1

*Primary Examiner*—John A. Pekar
*Attorney, Agent, or Firm*—Leydig, Voit & Mayer

[57] ABSTRACT

A device for controlling a motor-driven power steering system for a vehicle comprising: a torque sensor for detecting operator-induced steering force exerted on a steering wheel by an operator and generating a voltage signal representative thereof; a motor operatively connected to power assist the steering motion caused by the operator through the steering wheel; a control unit electrically connected with the torque sensor through a connector interposed therebetween for controlling the power-assisting operation of the motor in response to the operator-induced steering torque detected by the torque sensor; and a converter interposed between the torque sensor and the connector for converting the voltage signal generated by the torque sensor into a proportional current signal to be supplied to the control unit. With the above arrangement, the control unit is input with an electrical signal precisely representing the steering torque measured by the torque sensor without being affected by any voltage drop during transmission of the electrical signal from the torque sensor to the control unit, so that the control unit can control the power assisting operation of the motor in accordance with the measured steering torque in a most precise manner.

6 Claims, 8 Drawing Figures

DEVICE FOR CONTROLLING A MOTOR-DRIVEN POWER STEERING SYSTEM FOR A VEHICLE

BACKGROUND OF THE INVENTION

1. Field of the Invention

This invention relates to a motor-driven power steering system for a vehicle adapted to assist the operator-induced steering operation by means of the rotating force of a motor, and more particularly to a device for controlling the operation of such a power steering system.

2. Description of the Prior Art

In the past, a conventional power steering system of this type, as schematically illustrated in FIG. 7, has hitherto been known in which a steering wheel 1 is operatively connected through a steering shaft 2 and a first rack and pinion gear $T_1$ including a first pinion 5 and a first rack tooth portion 6a with a steering rack 6 which is connected at its opposite ends with a pair of steerable road wheels (not shown) through a pair of tie rods 8a and 8b so that when the steering wheel 1 is turned by an operator, the steerable road wheels (not shown) are appropriately steered in accordance with the steering motion of the steering wheel 1 imparted by the operator. On the other hand, the steering rack 6 is operatively connected with a motor 13 through a second rack and pinion gear $T_2$ including a second rack tooth portion 6b and a second pinion 18 and a speed-reduction gear R so that the driving force of the motor 13 is transmitted through the speed-reduction gear R and the second rack and pinion gear $T_2$ to the rack 6 so as to assist the steering operation of the steering wheel 1 imparted by the operator. The motor 13 is electrically connected with a battery 11 through a control unit 9 and a key or ignition switch 12 so that it is energized by the battery 11 under the control of the control unit 9. The control unit 9 is input with control signals from a steering-torque sensor 3 and a vehicle-speed sensor 10 so as to appropriately control the operation of the motor 13 and the switching clutch 17 on the basis of the steering torque and the vehicle speed measured. The steering torque-sensor 3 is mounted on the steering shaft 2 for measuring the operator induced steering torque resulting from the steering force exerted on the steering wheel 1 by the operator, and has a sensor element 3a (FIG. 8) which is connected via a connector means or slip rings 19 to the control unit 9 so that the measured steering torque of the steering wheel 1 is converted by the torque sensor 3 into a voltage signal which is in turn transmitted to the control unit 9 by way of the connector or slip rings 19.

With the conventional power steering system as constructed above, the torque sensor 3 only serves to convert the measured steering torque into a voltage signal and no provision is made for preventing a voltage drop at the connector or slip rings 19 and/or a conducting line 20 connecting between the torque sensor 3 and the control unit 9. Such a voltage drop during transmission of the voltage signal necessarily results in a change in the measured steering torque value to be input into the control unit 9, thus making it possible for the control unit 9 to precisely control the power assisting operation of the motor 13 in accordance with the measured steering torque value.

SUMMARY OF THE INVENTION

In view of the above, the present invention has the objective of eliminating the above-described problems of the prior art, and has for its main object the provision of a novel and improved device for controlling a motor-driven power steering system for a vehicle capable of inputting to a control unit an electrical signal precisely representing a measured steering torque without being affected by any voltage drop during transmission of the electrical signal from a torque sensor to the control unit, thereby enabling the control unit to control the power assisting operation of a motor in accordance with the measured steering torque in a most precise manner.

In order to achieve the above object, according to one aspect of the present invention, there is provided, in a motor-driven power steering system for a vehicle having a steering wheel operatively connected to steer steerable road wheels, a device for controlling the operation of the motor-driven power steering system comprising:

a torque sensor connected to detect operator-induced steering torque resulting from steering force exerted on the steering wheel by an operator and generating a voltage signal representative thereof;

a motor operatively connected to power assist the steering motion caused by the operator through the steering wheel;

a control unit electrically connected with the torque sensor through a connector means interposed therebetween for controlling the power-assisting operation of the motor in response to the operator-induced steering force detected by the torque sensor; and a converter interposed between the torque sensor and the connector means for converting the voltage signal generated by the torque sensor a proportional current signal to be supplied to the control unit.

According to another aspect of the invention, there is provided a device for controlling a motor-driven power steering system for a vehicle comprising:

a steering wheel;

a steering shaft fixedly connected with the steering wheel for integral rotation therewith;

a speed sensor connected to detect travelling speed of the vehicle and generating an output signal representative thereof;

a torque sensor mounted on the steering shaft for detecting operator-induced steering torque resulting from steering force exerted on the steering wheel by an operator and generating an voltage signal representative of a detected steering torque;

a first pinion operatively connected with the steering shaft and adapted to be driven by the steering wheel through an intermediary of the steering shaft;

a rack operatively connected through tie rods with a pair of steerable road wheels and having a first rack tooth portion and a second rack tooth portion formed thereon, the first rack tooth portion being in meshing engagement with the first pinion;

a second pinion being in meshing engagement with the second rack tooth portion on the rack;

a motor operatively connected through a speed-reduction gear with the second pinion for power assisting a steering motion of the rack induced by the operator through an intermediary of the steering wheel, the steering shaft, the first pinion and the first rack tooth portion;

a first electromagnetic sliding clutch interposed between the motor and the second pinion for transmitting power therebetween substantially proportion to a current supplied thereto;

a second electromagnetic clutch interposed between the motor and the second pinion for selectively establishing and disconnecting the operative connection therebetween;

a control unit adapted to receiver output signals from the speed sensor and the torque sensor for controlling operations of the motor, the first clutch and the second clutch, the control unit being electrically connected with the torque sensor through a connector and;

a converter interposed between the torque sensor and the connector means for converting the voltage signal generated by the torque sensor into a proportional current signal to be supplied through the connector means to the control unit.

In one embodiment, the converter is incorporated in the torque sensor, while in another it comprises a preamplifier.

The above and other objects, features and advantages of the present invention will become apparent from the following detailed description of several presently preferred embodiments of the invention when taken in conjunction with the accompanying drawings.

BRIEF DESCRIPTION OF THE DRAWINGS

FIGS. 1 through 6 relates to a motor-driven power steering system having a control device in accordance with the present invention, in which FIG. 1 is a schematic view illustrating a general arrangement of the same;

FIG. 2 is a schematic view showing an electrical connection between a torque sensor and the control unit;

FIG. 3 is a graphic representation showing a voltage/current conversion characteristic of a preamplifier disposed between the torque sensor and a connector;

FIG. 4 is a characteristic view showing a relationship between clutch current and transmission torque;

FIG. 5 is a characteristic view showing a relationship between steering torque and motor voltage and a relationship between steering torque and first-clutch current; and FIG. 6 is a characteristic view showing a relationship between vehicle speed and first-clutch current and a relationship between vehicle speed and second-clutch current.

DESCRIPTION OF THE PREFERRED EMBODIMENTS

Figure 7:
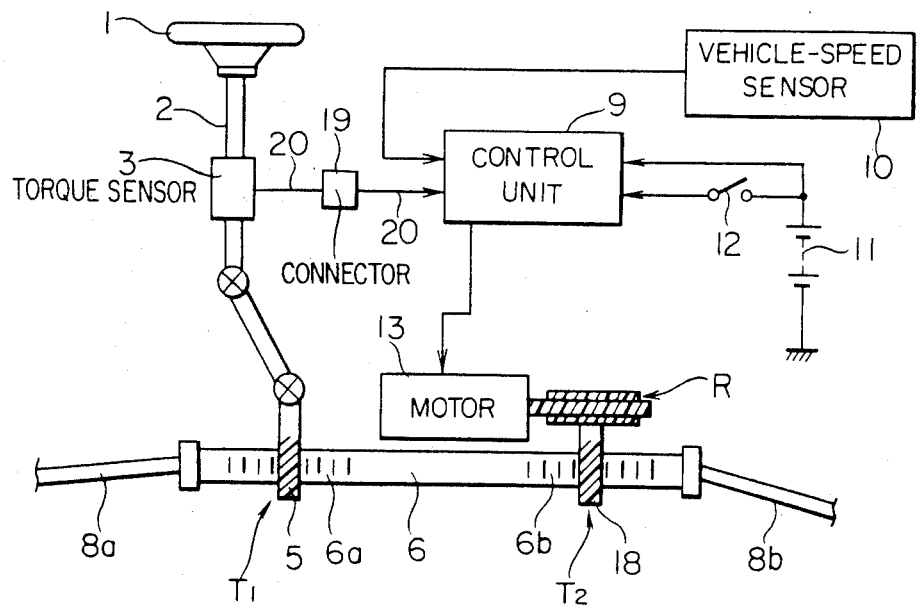
FIG. 7 is a view similar to FIG. 1, but showing a motor-driven power steering system having a conventional control device.
Figure 8:
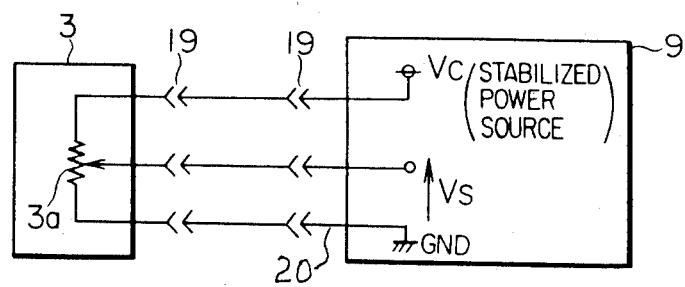
FIG. 8 is a view similar to FIG. 2, showing an electrical connection between a torque sensor and a control unit of the conventional control device of FIG. 7.

The present invention will now be described in detail with reference to a presently preferred embodiment thereof as illustrated in the accompanying drawings. In the following, the same parts or elements of this embodiment will be identified by the same reference numerals and reference characters as employed in the prior art shown in FIG. 7.

Figure 1:
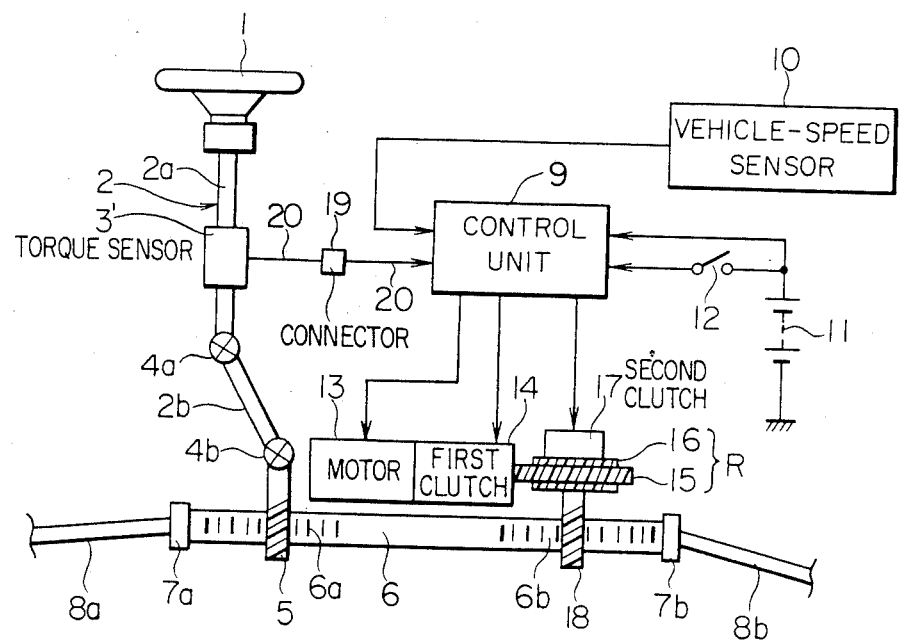

Referring to the drawings and first to FIG. 1, there is schematically shown a motor-driven power steering system having a control device for a vehicle constructed in accordance with the present invention. In FIG. 1, the motor-driven power steering system comprises a steering wheel 1 and a steering shaft 2 fixedly connected at its upper end with the steering wheel for integral rotation there-with. A torque sensor 3' is mounted on the steering shaft 2 for detecting the operator-induced steering torque resulting from the steering force exerted on the steering wheel 1 by an operator and generating an electrical signal representative of the detected steering torque. The steering shaft 2 includes an upper section 2a and a lower section 2b joined with each other through a first universal joint 4a. A first pinion 5 is operatively connected at its upper end with the lower end of the steering shaft 2 through a second universal joint 4b, and a rack 6 is operatively connected at its opposite ends through ball joints 7a, 7b with tie rods 8a, 8b which are in turn connected with a pair of steerable road wheels (not shown). The rack 6 has a first tooth portion 6a in mesh with the first pinion 5 and a second tooth portion 6b axially spaced from or otherwise continuous with the first tooth portion 6a. The system further comprises a vehicle-speed sensor 10 for detecting the travelling speed of a vehicle and generating an output signal representative of the detected vehicle speed, a battery 11 adapted to be mounted on the vehicle, a key or ignition switch 12; and a second pinion 18 in meshing engagement with the second rack tooth portion 6b on the rack 6. A motor 13 is operatively connected through a speed-reduction gear R with the second pinion 18 for power assisting the steering motion of the rack 6 induced by the operator, the motor being preferably in the form of a direct current motor having a shunt winding field or a magnetic field and adapted to be driven to rotate by the battery 11. A first electromagnetic clutch 14 interposed between the motor 13 and the second pinion 18 transmits power therebetween substantially in proportion to the intensity of current supplied thereto, the first clutch 14 being preferably in the form of an electromagnetic sliding clutch such as, for example, a powder clutch, a hysteresis clutch or the like and directly coupled, in the illustrated embodiment, with an output shaft of the motor 13. A second clutch 17 in the form of an electromagnetic switching clutch is interposed between the motor 13 and the second pinion 18 for selectively establishing and disconnecting an operative connection therebetween. Finally, a control unit 9 is adapted to receive output signals from the vehicle-speed sensor 10 and the torque sensor 3 for controlling the operations of the motor 13 and the first and second clutches 14 and 17, the control unit 9 being electrically connected with the torque sensor 3' through a connector means or slip rings 19 interposed therebetween. In the illustrated embodiment, the speed-reduction gear R comprises a worm 15 operatively connected with an output shaft of the first sliding clutch 14 and a worm wheel 16 in the form of a nut in mesh with the worm 15, and the second electromagnetic switching clutch 17 serves to mechanically couple or disconnect the worm wheel 16 with the second pinion 18.

Figure 2:
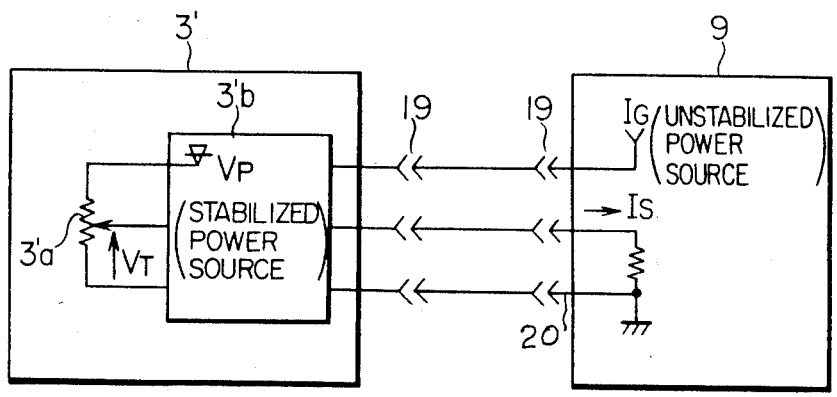
Figure 3:
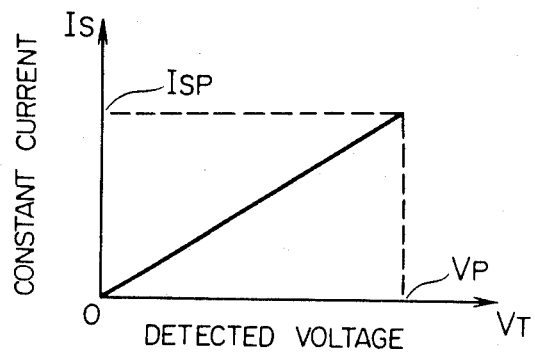

According to the present invention, as clearly shown in FIG. 2, the torque sensor 3' includes a sensor element 3'a for generating a voltage $V_t$ corresponding to or representative of the steering torque resulting from the steering force exerted on the steering wheel 1 by an operator, and a voltage/current converter 3'b such as a preamplifier. The converter 3'b converts the voltage generated by the sensor element 3'a into constant current $I_S$, the intensity of which corresponds to or is in direct proportion to the operator-induced steering torque measured, as illustrated in FIG. 3. The current $I_S$ thus converted is fed to the control unit 9 through a conductor line 20 and the connector means 19. In this manner, a voltage signal representative of the operator-induced steering torque is converted into a constant current directly proportional to the steering torque so that a voltage drop developing across the connector means 19 and/or the conductor lines 20 connecting the torque sensor 3' and the control unit 9 does not affect the electrical signal in the form of constant current fed to the control unit 9. Thus, the control unit 9 to precisely control the power steering operation of the system in accordance with the steering torque imparted to the steering wheel 1 by the operator. Further, conversion of the voltage signal into the constant current signal can markedly improve the noise-resisting characteristics of such a signal even during long-distance transmission, providing high reliability and stability in operation.

Although in the above embodiment, the converter 3'b is incorporated in the torque sensor 3', it may be formed separately from the torque sensor 3' and disposed outside the torque sensor 3' at a location between the torque sensor 3' and the connector means 19.

Figure 5:
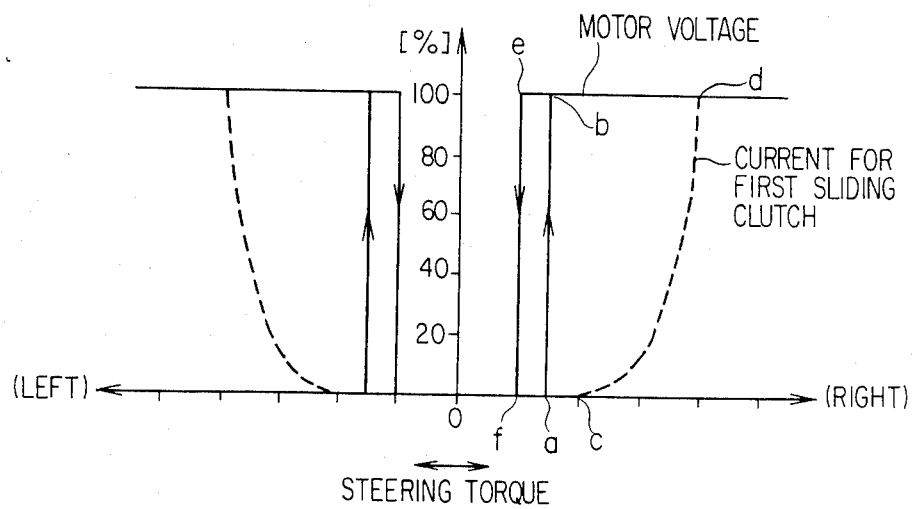

In operation, the control unit 9 controls the operations of the motor 13 and the first sliding clutch 14 in the manner illustrated in FIG. 5. First, let us consider the case in which a vehicle is stationary or standing still. In this case, when the key switch 12 is first turned on for engine starting, the second electromagnetic clutch 17 is automatically actuated to place the second pinion 18 into mechanical coupling with the worm wheel 16. In this state, when the steering wheel 1 is caused to turn by an operator, the control unit 9 acts to control the operations of the motor 13 and the sliding clutch 14 in the manner as illustrated in FIG. 5. More specifically, when steering torque increases in the righthand direction to point a in FIG. 5, the motor 13 is turned on and then imposed with 100% voltage at point b. As the steering torque further increases, current begins to flow through the first electromagnetic sliding clutch 14 at point c and the intensity of the current increases in a logarithmic relation with respect to an increase in the steering torque, and reaches 100% current at point d. On the other hand, as the steering torque decreases, current flowing through the first electromagnetic sliding clutch 14 begins to decrease at point d and reaches 0% current at point c. In accordance with a further decrease in the steering torque, the motor 13 is turned off at point e so that the voltage imposed on the motor 13 becomes 0% at point f. Similar to this, the motor 13 and the first electromagnetic sliding clutch 14 are controlled in the same manner when the steering torque increases or decreases in the lefthand direction.

Figure 4:
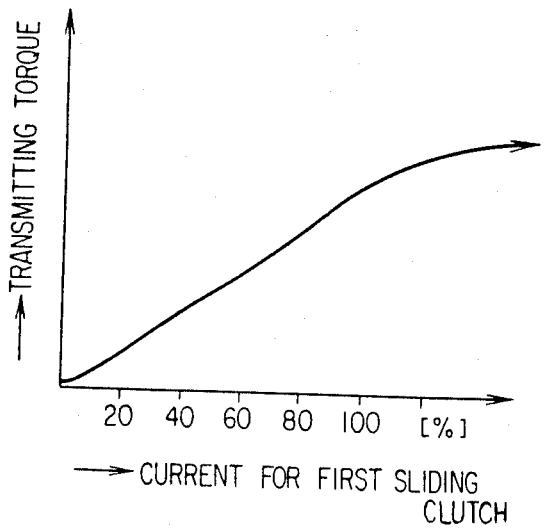

As shown in FIG. 4, the characteristic of the first sliding clutch 14 is used in a range in which transmitting torque or sliding torque increases substantially in direct proportion to clutch current. Accordingly, as is clear from FIG. 5, the motor 13 is imposed with 100% voltage and energized to start rotating when the steering torque increases to point a. As the steering torque further increases, current flowing through the first sliding clutch 14 beings to gradually increase at point c so that the output torque transmitted from the first sliding clutch 14 to the worm 15 increases gradually. As a result, auxiliary torque having an intensity corresponding to the steering force exerted on the steering wheel 1 by an operator is transmitted from the motor 13 to the second tooth portion 6b on the rack 6 via the first sliding clutch 14, the worm wheel 16, the second electromagnetic clutch 17 and the second pinion 18, thereby lightening the steering operation for the operator.

Figure 6:
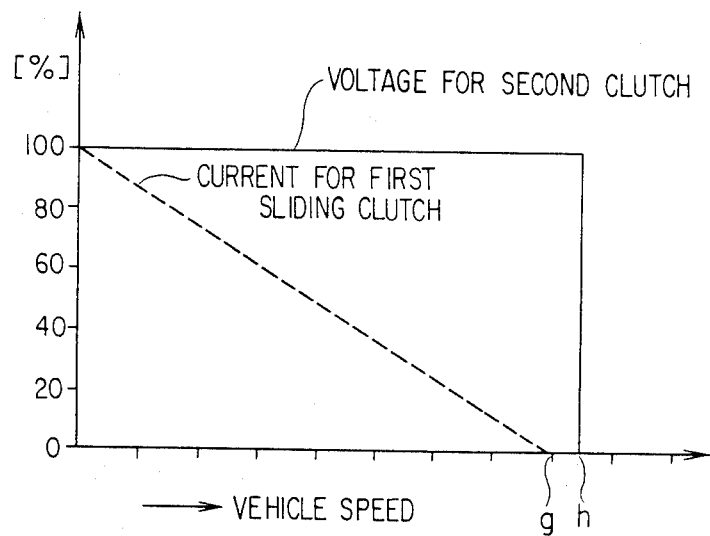

Now, let us consider the case in which the vehicle is travelling. In this case, as seen from FIG. 6, current flowing through the first sliding clutch 14 is controlled by the control unit 9 so that it decreases in inverse proportion to an increase in vehicle speed. Thus, the sliding clutch current becomes 0% at point g in FIG. 6. That is, even if the steering force is exerted on the steering wheel 1 by an operator, current flowing through the first sliding clutch 14 becomes zero. Moreover, when the vehicle speed increases to point h in FIG. 6, the second electromagnetic clutch 17 is deactuated or turned off so that engagement or mechanical coupling between the worm wheel 16 and the second pinion 18 is released or disconnected. As a consequence, when turning the steering wheel 1, the operator only feels a load which is caused by meshing engagement between the second rack tooth portion 6b and the second pinion 18. In other words, the steering system simply reverts to a manual steering without power assistance. On the other hand, when the vehicle speed decreases, the control unit 9 operates such that the second electromagnetic clutch 17 is actuated or turned on at point h to provide mechanical coupling between the second pinion 18 and the worm wheel 16, and current flowing through the first sliding clutch 14 is gradually increased from point g.

What is claimed is:

1. In a motor-driven power steering system for a vehicle having a steering wheel operatively connected to steer steerable road wheels, a device for controlling the operation of said motor-driven power steering system comprising:
   a torque sensor connected to detect operator-induced steering torque resulting from steering force exerted on said steering wheel by an operator and generating a voltage signal representative thereof;
   a motor operatively connected to power assist steering motion caused by the operator through said steering wheel;
   a control unit electrically connected with said torque sensor through a connector means interposed therebetween for controlling the power-assisting operation of said motor in response to the operator-induced steering torque detected by said torque sensor; and
   a converter interposed between said torque sensor and said connector means for converting the voltage signal generated by said torque sensor into a proportional current signal to be supplied to said control unit.

2. A device for controlling a motor-driven power steering system for a vehicle according to claim 1 wherein said converter in incorporated in said torque sensor.

3. A device for controlling a motor-driven power steering system for a vehicle according to claim 1, wherein said converter comprises a preamplifier.

4. A device for controlling a motor-driven power steering system for a vehicle comprising:
   a steering wheel;
   a steering shaft fixedly connected with said steering wheel for integral rotation therewith;

a speed sensor connected to detect travelling speed of the vehicle and generating an output signal representative thereof;

a torque sensor mounted on said steering shaft for detecting operator-induced steering torque resulting from steering force exerted on said steering wheel by an operator and generating an output voltage signal representative of the detected steering torque;

a first pinion operatively connected with said steering shaft and adapted to be driven by said steering wheel through an intermediary of said steering shaft;

a rack operatively connected through tie rods with a pair of steerable road wheels and having a first rack tooth portion and a second rack tooth portion formed thereon, said first rack tooth portion being in meshing engagement with said first pinion;

a second pinion being in meshing engagement with said second rack tooth portion on said rack;

a motor operatively connected through a speed-reduction gear with said second pinion for power assisting a steering motion of said rack induced by the operator through an intermediary of said steering wheel, said steering shaft, said first pinion, and said first rack tooth portion;

a first electromagnetic sliding clutch interposed between said motor and said second pinion for transmitting power therebetween substantially in proportion to a current signal supplied thereto;

a second electromagnetic clutch interposed between said motor and said second pinion for selectively establishing and disconnecting the operative connection therebetween;

a control unit adapted to receive output signals from said speed sensor and said torque sensor for controlling operations of said motor, said first clutch, and said second clutch, said control unit being electrically connected with said torque sensor through a connector means; and a converter interposed between said torque sensor and said connector means for converting the voltage signal generated by said torque sensor into a proportional current signal to be supplied through said connector means to said control unit.

5. A device for controlling a motor-driven power steering system for a vehicle according to claim 4 wherein said converter is incorporated in said torque sensor.

6. A device for controlling a motor-driven power steering system for a vehicle according to claim 4 wherein said converter comprises a preamplifier.

* * * * *